Feb. 25, 1930. B. A. VAN WORMER 1,748,198
WHEEL
Filed July 10, 1929
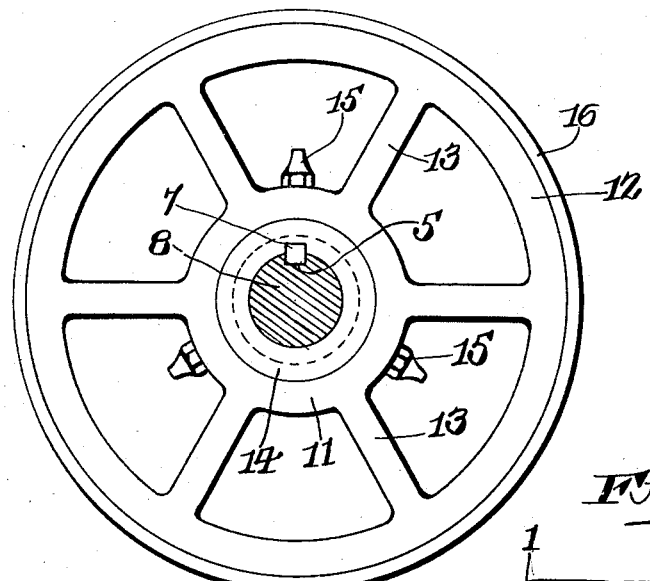
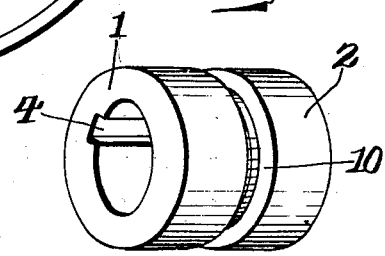
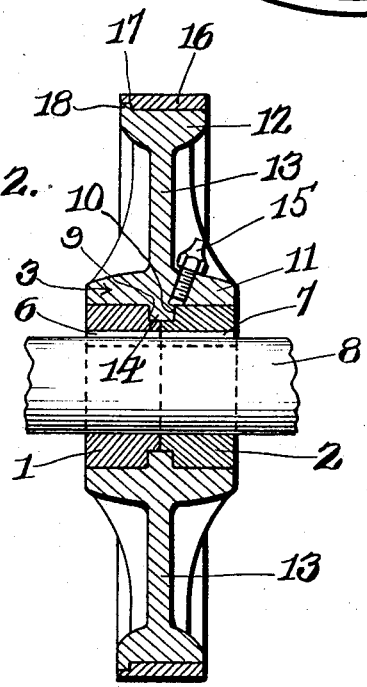
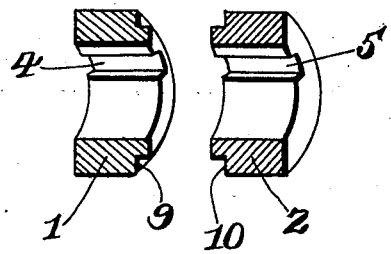
INVENTOR.
Bernard A. Van Wormer,
BY
Geo. P. Kimmel
ATTORNEY.

Patented Feb. 25, 1930

1,748,198

UNITED STATES PATENT OFFICE

BERNARD A. VAN WORMER, OF LA GRANDE, OREGON

WHEEL

Application filed July 10, 1929. Serial No. 377,177.

This invention relates to a wheel particularly adapted for use in connection with saw mill carriages.

As is well known, the inner rails of saw mill carriage tracks are subjected to dirt, grit, bark, saw dust, and the like while the outer rails of the track are maintained comparatively clear.

In the ordinary construction of saw mill carriages and wheels, the wheels are fixedly secured to the axles to rotate therewith and in the operation of the carriage, the inner rails and wheels are subjected to greater wear than the outer rails and wheels with the result that the inner wheels soon become worn to such an extent that they no longer have the same diameter as the outer wheels. As the difference in diameter of the wheels increases, the amount of wear correspondingly increases and more power is required to propel the carriage in order to maintain the speed of the latter constant. At the same time, the rails are worn unevenly and periodical closing of the mill becomes necessary to make repairs to the wheels and rails.

My invention resides in a new and improved wheel adapted to be substituted for the usual solid wheel operating on either the inner or outer rail and has for its primary object to provide, in a manner as hereinafter set forth, a wheel of such class, by means of which the unevenness in the wear of the wheels and rails may be materially reduced, with a corresponding reduction in the expense of propelling the carriage and of maintaining the wheels and track in repair.

A further object of the invention is to provide a wheel of the class above mentioned, which is thoroughly efficient in its intended use and which may be machined at a minimum of expense.

With the foregoing and other objects in view, the invention consists of the novel construction, combination and arrangement of parts as hereinafter more particularly described, and as illustrated in the accompanying drawings, wherein is shown an embodiment of the invention, but it is to be understood that the description and drawings are to be taken as illustrative and that the invention is intended to be limited only by the scope of the claims hereunto appended.

In the accompanying drawings in which like numerals are employed to designate like parts throughout the same:—

Figure 1 is a side elevation of a wheel constructed in accordance with this invention.

Figure 2 is a vertical transverse section therethrough.

Figure 3 is a perspective view of the sectional hub portion of the wheel.

Figure 4 is a sectional view of the sections of the hub, showing the sections in non-assembled relation.

Referring to the drawings in detail, the numerals 1 and 2 indicate the inner and outer sections respectively of a hub, upon which the wheel body 3 is adapted to be mounted. The inner peripheries of the sections 1 and 2 respectively are formed with longitudinally extending key-ways 4 and 5 for the reception therein of keys 6 and 7, by means of which the sections 1 and 2 may be keyed to an axle 8 to rotate therewith. The sections 1 and 2 are adapted to be assembled on the axle in abutting relation and the contacting faces of the sections are notched as indicated at 9 and 10 to provide a circumferentially extending groove in the outer periphery of the hub, centrally of the latter.

Adapted to be mounted on the hub is the body portion 3 of the wheel, which includes a hub member 11, a felloe 12, and a plurality of spokes 13 connecting the hub member and felloe. The hub member 11 is formed on its inner face with a circumferentially extending rib 14 which seats within the groove formed by the notches 9 and 10 in the hub sections 1 and 2. Extending through the hub member 11 is a plurality of spaced grease nipples 15, through which a suitable lubricant may be transmitted to the contacting surfaces of the hub member 11 and sections 1 and 2.

Mounted on the felloe is a tire 16, which is formed in its inner edge with a recess 17 for the reception therein of a circumferentially extending shoulder 18 formed on the outer periphery of the felloe 12, adjacent the inner edge of the latter. The tire 16 may be secured to the felloe 12 in any suitable manner, such as by shrinking, clamping, bolting or the like, and may be readily centered with respect to the felloe by means of the recess 17 and shoulder 18.

In assembling my improved wheel, preferably the inner section 1 will be keyed or otherwise secured to the axle 8, then the body portion 3 of the wheel placed in position with the rib 14 engaging the walls of the notch 9, and then the outer section 2 placed in position and keyed or otherwise secured to the axle 8 with the walls of the notch 10 engaging the rib 14.

It is thought that the many advantages of a wheel in accordance with this invention will be readily apparent, and although the preferred embodiment of the invention is as illustrated and described, it is to be understood that various changes in the details of construction may be resorted to, so long as such changes fall within the scope of the invention as defined in the appended claims.

What I claim is:

1. A wheel comprising, a hub formed of a pair of sections for mounting on an axle to rotate therewith, said sections being formed with means to provide a circumferentially extending groove in the outer periphery of the hub, a wheel body rotatably mounted on the hub, and means on the wheel body for coaction with said groove to maintain the body and hub in assembled relation.

2. A wheel comprising, a hub formed of a pair of sections for mounting in contacting relation on an axle, means to provide for the unitary rotation of the hub and axle, said sections having their contacting faces formed with recesses to provide the outer periphery of the hub with a circumferentially extending groove, a wheel body including a hub element rotatably mounted on the hub, and a circumferentially extending rib formed on the inner face of said hub element for engagement with the walls of said recesses.

In testimony whereof, I affix my signature hereto.

BERNARD A. VAN WORMER.